United States Patent [19]

Lando

[11] 4,043,071
[45] Aug. 23, 1977

[54] FISHING ROD ASSEMBLY
[75] Inventor: Joseph A. Lando, Long Grove, Ill.
[73] Assignee: Land-O-Tackle, Harwood Heights, Ill.
[21] Appl. No.: 695,249
[22] Filed: June 11, 1976
[51] Int. Cl.² ............................................. A01K 87/02
[52] U.S. Cl. ......................................................... 43/23
[58] Field of Search .................................. 43/23, 18 R
[56] References Cited
U.S. PATENT DOCUMENTS

| 2,534,027 | 12/1950 | Irvan | 43/23 |
|---|---|---|---|
| 2,610,427 | 9/1952 | Caroland | 43/18 R |
| 2,756,531 | 7/1956 | Hollenshead | 43/23 X |
| 2,995,853 | 8/1961 | Ohliger | 43/23 X |
| 3,269,049 | 8/1966 | Emmons | 43/23 |

Primary Examiner—Louis G. Mancene
Assistant Examiner—Daniel J. Leach
Attorney, Agent, or Firm—Dominik, Knechtel, Godula & Demeur

[57] ABSTRACT

A fishing rod assembly, which has a handle part and an adapter part, being two separate pieces. The handle has a socket at one end with a threaded shaft extending upwardly from the bottom of the socket. The adapter has a plug portion with a threaded bore extending inwardly from the face of said plug. In assembly, the plug of the adapter is closely inserted within the socket and the bore and shaft are threadably engaged so that the two parts are securely interlocked. A rod is mounted to the adapter in bonding relationship, and various adapters with different types of rods may be interchangeably mounted to the handle.

4 Claims, 3 Drawing Figures

FISHING ROD ASSEMBLY

FIELD AND BACKGROUND OF THE INVENTION

This invention relates to an assembly which has a grip, a handle and an adapter for a rod. The grip and handle are joined as one unitary part, and the adapter is a separate part. The invention particularly relates to improved means for interlocking such parts.

The art has concerned itself with various assemblies of handles and rod adapters, the conventional design being a plug or tapered portion on the rod which is inserted into a socket portion of the handle. The two pieces have been shown to be held together by a friction or similar fit, see, for example, U.S. Pat. Nos. 2,756,531; 3,426,466; and 2,702,192.

The present invention leads to the objects and advantages in the fishing rod area which will now, in part, be enumerated.

OBJECTS AND ADVANTAGES OF THE INVENTION

An object of the present invention is to provide an improved securing means whereby a handle part and an adapter part of a fishing rod can be readily assembled and securely fastened together without the use of externally applied fastening means.

Another object of the present invention is a grip, handle and rod adapter assembly which has improved support at the point of joining the adapter and handle parts.

It is another feature and advantage that the handle and the adapter parts may be secured together by threadable means so that the two parts cannot easily be pulled apart without imparting an unscrewing motion. Another advantage is that the threadable means are integral with the adapter and handle parts so that external fastening means which can be easily lost are not required.

Yet another object is the provision of interchangable adapters, having rods with differing characteristics, but which adapters have uniform portions for telescopically and threadably engaging complementary portions of a handle part.

The foregoing objects and advantages are realized, together with still other objects and advantages, by considering the disclosure of the following invention which includes drawings wherein.

SUMMARY OF THE INVENTION

An assembly for a fishing rod is now provided in which a handle has a grip fixed to one end and the other end has a threaded element at the bottom of a socket. The threaded element engages a complementary threaded element associated with an end wall of a plug on an adapter, the plug being inserted within the socket. One of the threaded elements is a male and the other a female, the female threaded element present has a bore preferably in the plug and the male element extending upwardly from the bottom of the socket; the threaded elements are positively aligned simply upon insertion of the plug into the socket. The threaded shaft and bore are preferably made of a metal so that additional strength and wearing properties are inherent in the parts.

This results in a strengthened junction of the two parts, and further results in a joining of the handle and adapter parts by an improved means in which the parts are positively aligned and securely threadably interlocked. The plug on the adapter is dimensioned to substantially fill the volume of the socket, but the end of the plug is out of contact with the bottom of the socket. A shoulder around the plug abuts an annular edge of the socket when the threaded means are finally engaged, and such abutment results in a tight junction of the handle and adapter, the plug not bottoming in the socket, thereby not interfering with the desired tight junction. The shoulder and annular edge have substantially coincidental dimensions so a substantially unbroken surface is formed between the joined parts.

DETAILED DESCRIPTION OF THE INVENTION

Figure 1:
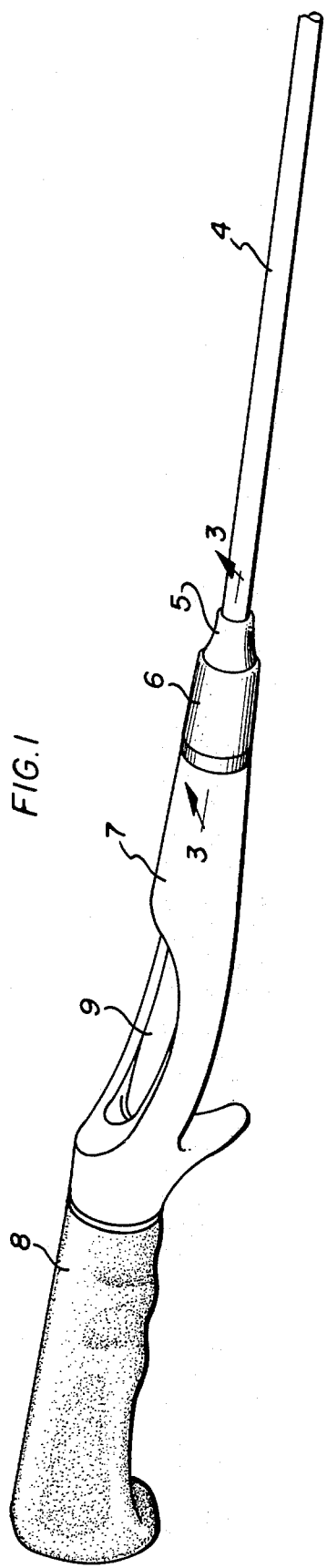
FIG. 1 is a perspective view of the fishing rod assembly with a portion of the shaft removed.

FIG. 1 shows the fishing rod in assembled form as having a rod 4 with a portion removed. The rod is joined to a hosel 5, adapter 6 and a handle 7. A grip 8 is fixed to the handle, and such handle preferably includes a resilient material or cover for more comfortable handling. Such grip includes a conventional finger pistol grip, not identified by number, and a reel well 9. In operation, the user grasps the fishing rod at the grip 8 and generally wraps his index finger around the finger pistol grip for control and support. A reel, not shown, is mounted in the reel well 9 with the aid of clips or the like, also not shown.

Figure 2:
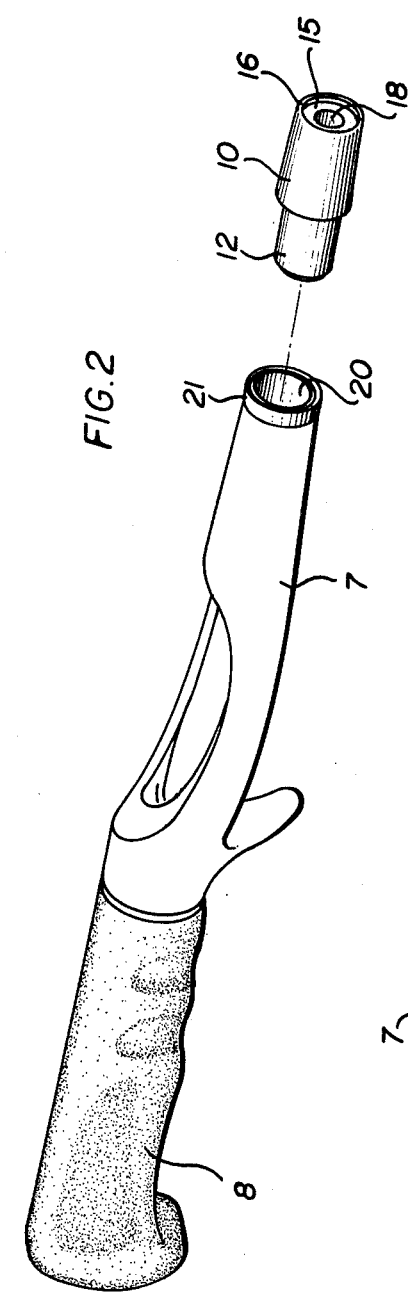
FIG. 2 is a perspective view similar to FIG. 1, but showing the separation of the rod and grip and their mating relationship.

FIG. 2 shows the combination of a grip, handle and adapter which particularly comprise the invention, particularly the interlock of the adapter to the handle. The adapter 6 includes a body portion 10 and a cylindrical plug portion 12 of reduced diameter relative to the body portion. A continuous shoulder 14 separates the body 10 from the plug 12. The plane of the shoulder 14 is substantially perpendicular to the long axis of the adapter.

The face 15 of the body portion is slightly lowered relative to continuous edge 16, and a rod passageway 18 communicates with said face. The rod passageway 18 terminates in bottom 19 within cylindrical plug portion 12. The plug is telescopically received in cylindrical socket 20 of the handle 7. The socket may have a ring 21 at the annular edge 22 which defines the open end of the socket. The ring provides an esthetic element which additionally imparts rigidity and protects the edges of the socket from damage. The widths of the annular edge and continuous shoulder have the same dimensions so that the mounted rod assembly presents a continuous, unbroken surface between the handle and the adapter.

Figure 3:
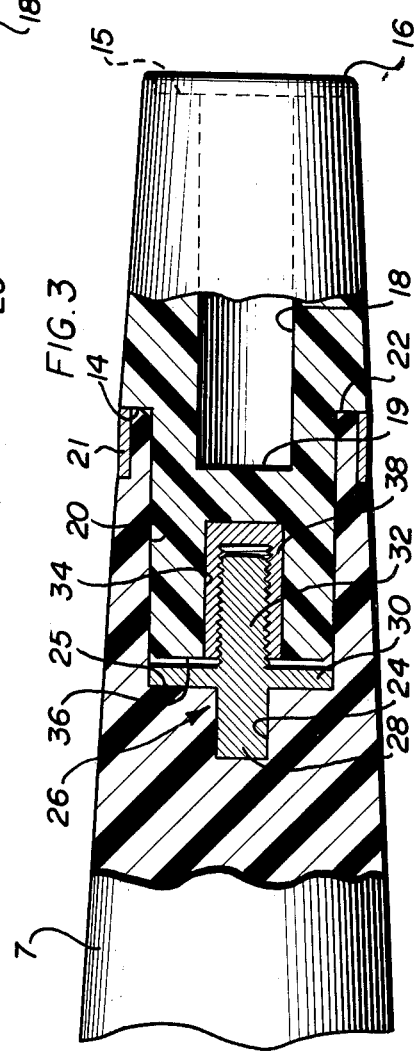
FIG. 3 is a sectional view with portions removed taken along line 3—3 of FIG. 1, on an enlarged scale.

FIG. 3 shows a mounting bore 24 in the bottom 25 of the socket 20. An insert element 26 has a stub shaft 28 which is dimensioned so that it is closely received by the bore 24. The insert 26 also has a dividing plate 30 which resets against the bottom 25 of the socket. Thus, the insert element 26 is securely embedded and held in the handle member 7 by a friction fit, using adhesive, if desired. The insert element 26 also has a threaded male element or shank 32 extending from the dividing plate and shown as being coaxially aligned with stub shaft 28.

There is a mounting passage 34 in the center of the plug 12 which communicates with the end wall 36 of the plug 12. The mounting passage contains a threaded female element or bushing 38. The bushing is closely received so as to be securely retained in the mounting passage of the cylindrical plug. The bushing threadably engages shank 32 of insert 26.

The threaded shank 32 and threaded bushing 38 are positively aligned along the long axis of the handle and adapter. The parts are screwed together until the shoulder 14 of the adapter is tightly seated against the annular edge which defines the socket 20. The end wall 36 of the cylindrical plug is spaced from the bottom 25 of the socket to assure a tight junction between the shoulder 14 of the adapter and the annular edge 22 which defines the socket. The complementary dimensions of the cylindrical plug and socket further contribute to the rigid but interchangable interlock of the adapter and the handle.

In use, a rod element is bonded in the rod passageway of the adapter, and a hosel element may be mounted, if desired, by bonding the base of the hosel to the recessed face of the adapter. In any event, various adapters may be provided which have uniform cylindrical plug dimensions so that all such adapters can be threadably mounted within a socket of a given handle, but which adapters have rods of different characteristics. One adapter may have a livelier rod bonded to the rod passageway and another adapter have a more rigid rod thusly mounted. The user can then select the rod he desires and threadably mount it to the handle after removing the previously mounted adapter and rod. One adapter may have a rod passageway of different dimensions from another one to accommodate a rod of different properties. A lighter, more flexible or lively rod will generally be of a smaller diameter than a rod which is substantially less flexible. The adapter with the rod bonded to the passageway may be considered as one unitary part which is threadably engaged to the handle and grip which comprises another unitary part. The two parts form a tight and secure junction as the adapter is screwed down and within the socket of the handle, the annular edge of the socket intercepting the shoulder of the adapter before the end wall of the cylindrical plug is bottomed within the socket.

The claims of the invention are now presented and the terms of such claims will be further understood by reference to the preceding specification and the views of the drawings.

What is claimed is:

1. A grip, handle and adapter assembly for a fishing rod which includes, in combination,
    a handle portion having a well for a reel, a forward end and a rear end, a grip portion fixed to said rear end of the handle portion,
    a cylindrical mounting socket in the forward end of said handle portion, said mounting socket having an annular edge at the end of the handle portion,
    an adapter member having a body portion and a cylindrical plug portion of reduced diameter relative to said body portion, a continuous shoulder between said body portion and said plug portion, said plug portion having an end wall remote from said continuous shoulder and said body portion having a face remote from said continuous shoulder, a rod passageway extending inwardly from said face to receive a rod in bonding relationship,
    said rod passageway extending along the length of said body portion and into said cylindrical plug portion but terminating short of a threaded bore which extends inwardly from an end wall of said cylindrical plug portion, said cylindrical mounting socket having dimensions complementary to said cylindrical plug portion to allow said cylindrical plug portion to be closely inserted within said cylindrical mounting socket,
    a threaded shank extending upwardly from the bottom of said cylindrical mounting socket and threadedly received within said threaded bore to removably secure said adapter member to said handle portion, and
    said cylindrical plug portion having a dimension so that said end wall of said cylindrical plug portion does not contact the bottom of said mounting socket when said continuous shoulder of said adapter member abuts said annular edge of said mounting socket, thereby assuring a tight, substantially unbroken junction between the adapter member and the handle portion.

2. An assembly which includes the features of claim 1 wherein the face of the body portion is slightly recessed to seat the base of a hosel element.

3. A grip, handle and adapter assembly for a fishing rod which includes, in combination,
    a handle portion having a well for a reel, a forward end and a rear end, a grip portion fixed to said rear end of the handle portion,
    a cylindrical mounting socket in the forward end of said handle portion, said mounting socket having an annular edge at the end of the handle portion,
    an adapter member having a body portion and a cylindrical plug portion of reduced diameter relative to said body portion, a continuous shoulder between said body portion and said plug portion, said plug portion having an end wall remote from said shoulder, said cylindrical mounting socket having dimensions complementary to said cylindrical plug portion to allow said cylindrical plug portion to be closely inserted within said cylindrical socket, said body portion of said adapter member having a face remote from said continuous shoulder,
    a rod passageway extending inwardly from said face of said body portion into said cylindrical plug portion, and a rod bonded within said rod passageway,
    the base of said body portion being slightly recessed, and further including a hosel element bonded within said recess, said rod passing through said hosel element into said rod passageway,
    a threaded element being present on the bottom of the cylindrical mounting socket and on said end wall of said plug portion, one of said elements being a male threaded element and the other element being a complementary female threaded element, and
    said cylindrical plug portion having a dimension so that said end wall of said cylindrical plug portion does not contact the bottom of the cylindrical mounting socket when the continuous shoulder of the adapter member abuts the annular edge of the socket, thereby assuring a tight, substantially unbroken junction between the adapter member and the handle.

4. An assembly which includes the features of claim 3 wherein the female threaded element is a threaded bore extending inwardly from the end wall of the cylindrical plug, and the male threaded element is a threaded shank extending upwardly from the bottom of said socket.

* * * * *